United States Patent
Shah et al.

(10) Patent No.: US 10,164,378 B2
(45) Date of Patent: Dec. 25, 2018

(54) GROUNDING FOR HIGH-SPEED CONNECTORS

(71) Applicant: Microsoft Technology Licensing, LLC, Redmond, WA (US)

(72) Inventors: Akash Atul Shah, Seattle, WA (US); Daniel Beirne, Redmond, WA (US); Mark Gerard Rice, Seattle, WA (US); Kurt David Wrisley, Edmonds, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/600,341

(22) Filed: May 19, 2017

(65) Prior Publication Data
US 2018/0287309 A1  Oct. 4, 2018

Related U.S. Application Data

(60) Provisional application No. 62/479,211, filed on Mar. 30, 2017.

(51) Int. Cl.
*H01R 13/6582* (2011.01)
*H01R 13/187* (2006.01)
(Continued)

(52) U.S. Cl.
CPC ..... *H01R 13/65802* (2013.01); *H01R 13/187* (2013.01); *H01R 13/6466* (2013.01);
(Continued)

(58) Field of Classification Search
CPC ............ H01R 13/6583; H01R 13/6596; H01R 13/65802; H01R 13/6582
(Continued)

(56) References Cited

U.S. PATENT DOCUMENTS

| 5,151,054 A | 9/1992 | Briones et al. |
| 5,286,224 A | 2/1994 | Paulus |

(Continued)

FOREIGN PATENT DOCUMENTS

| CN | 201985332 U | 9/2011 |
| CN | 205944544 U | 2/2017 |

(Continued)

OTHER PUBLICATIONS

IFixit teardown of a Mac Mini A1283 (available on or before Feb. 20, 2014).*

(Continued)

*Primary Examiner* — Renee S Luebke
*Assistant Examiner* — Paul Baillargeon
(74) *Attorney, Agent, or Firm* — Alleman Hall Creasman & Tuttle LLP

(57) ABSTRACT

To address the issue of radio frequency interference with high-speed connectors, a communication port connector for use in a computing device is provided. The communication port connector may include a shell that defines a void that is configured to receive an electrical plug. Port-side electrical contacts in the shell may be configured to make electrical connections with plug-side electrical contacts. One or more double leaf spring fingers may be formed in a side of the shell, with each double leaf spring finger including a first spring finger coupled to a second spring finger. The first spring finger may be configured to contact the electrical plug, and the second spring finger may be configured to contact a chassis of the computing device, thereby creating a ground path to ground the electrical plug to the primary ground plane of the device when it is inserted into the communication port connector.

20 Claims, 7 Drawing Sheets

(51) Int. Cl.
  *H01R 13/6466* (2011.01)
  *H01R 13/6596* (2011.01)
  *H01R 13/658* (2011.01)
  *H01R 13/6587* (2011.01)
  *H01R 24/40* (2011.01)
  *H01Q 1/22* (2006.01)
  *G06F 13/38* (2006.01)

(52) U.S. Cl.
  CPC ..... *H01R 13/6582* (2013.01); *H01R 13/6587* (2013.01); *H01R 13/6596* (2013.01); *H01R 24/40* (2013.01); *G06F 13/385* (2013.01); *H01Q 1/2291* (2013.01)

(58) Field of Classification Search
  USPC ............ 439/607.17, 607.19, 607.28, 947, 95
  See application file for complete search history.

(56) References Cited

U.S. PATENT DOCUMENTS

| | | | |
|---|---|---|---|
| 5,319,864 A | 6/1994 | Amonett | |
| 5,934,939 A * | 8/1999 | Thenaisie | H01R 13/627 439/607.53 |
| 5,957,726 A | 9/1999 | Belopolsky et al. | |
| 6,416,361 B1 * | 7/2002 | Hwang | H01R 13/6594 439/607.2 |
| 6,926,557 B1 | 8/2005 | Yamaguchi et al. | |
| 7,018,220 B2 | 3/2006 | Zemba | |
| 7,210,954 B2 | 5/2007 | Ohki et al | |
| 7,581,967 B2 | 9/2009 | Collantes, Jr. et al. | |
| 7,727,018 B2 * | 6/2010 | Bright | H01R 13/741 439/607.28 |
| 7,758,381 B2 * | 7/2010 | Oki | H01R 13/6582 439/607.28 |
| 8,053,667 B2 * | 11/2011 | Chen | H05K 9/0058 174/50 |
| 8,616,919 B2 | 12/2013 | Stoner | |
| 8,641,450 B2 * | 2/2014 | Li | H01R 13/659 439/540.1 |
| 9,190,744 B2 | 11/2015 | Burris | |
| 9,356,404 B2 | 5/2016 | Yu et al. | |
| 2001/0049230 A1 | 12/2001 | Stickney | |
| 2009/0176409 A1 | 7/2009 | Oki | |
| 2016/0079708 A1 * | 3/2016 | Robinson | H01R 13/6474 439/607.05 |

FOREIGN PATENT DOCUMENTS

| | | |
|---|---|---|
| EP | 0913888 A2 | 5/1999 |
| WO | 9802940 A1 | 1/1998 |

OTHER PUBLICATIONS

EveryMac A1283 specification document (available on or before Apr. 18, 2012).*

"International Search Report and Written Opinion Issued in PCT Application No. PCT/US2018/023905", dated Jun. 13, 2018, 13 Pages.

* cited by examiner

GROUNDING FOR HIGH-SPEED CONNECTORS

CROSS REFERENCE TO RELATED APPLICATIONS

This application claims priority to U.S. Provisional Patent Application No. 62/479,211 filed Mar. 30, 2017, the entirety of which is hereby incorporated herein by reference.

BACKGROUND

Computer ports are widely used to provide an interface between a computing device and external devices or components. Recent advancements in technology have led to the development of high-speed ports that provide fast and efficient interfacing between computing devices and external components. However, these high-speed ports, such as those designed to be compatible with SUPERSPEED or SUPERSPEED+ UNIVERSAL SERIAL BUS (USB) specifications (USB 3.0 or USB 3.1), operate at frequencies that create radio frequency interference in the 2.4 GHz spectrum, which is a widely used band for wireless devices. Thus, the wireless sensitivity of nearby antennas, including WI-FI and BLUETOOTH, is often degraded by high-speed ports.

SUMMARY

To address the issues discussed above, a communication port connector housed in a computing system is provided. The communication port connector may include a shell, port-side electrical contacts, and one or more double leaf spring fingers. The shell may define a void that is configured to receive an electrical plug. The port-side electrical contacts may be positioned within the shell, and they may be configured to make electrical connections with plug-side electrical contacts of the electrical plug. The double leaf spring finger may include a first spring finger and a second spring finger coupled to the first spring finger. The first spring finger may be configured to flex toward the void to contact the electrical plug. The second spring finger may be configured to flex away from the void to contact a chassis of the device, to thereby electrically ground the electrical plug to the chassis when inserted in the communication port connector.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Recent advancements in data storage and data transfer have led to the development of high-speed connectors that can transfer large amounts of data quickly. When connected to devices and cables, the data spectrum of these high-speed connectors is very broadband and can range from DC to 20 GHz. As a result, radio frequency interference is created in the 2.4 GHz spectrum, which is a radio frequency band that is widely used for many types of wireless devices and computer peripherals. The "noise" caused by the high-speed connectors degrades the functionality of nearby wireless antennas, such as WI-FI or BLUETOOTH. The interference can reduce the rate or range of the wireless connection or even prevent antenna function entirely, and it can impact myriad wireless devices. For example, a user operating a wireless mouse may experience lag in scrolling and navigation when a cable or peripheral device is plugged into a nearby SUPERSPEED or SUPERSPEED+ USB port. This lag can lead to a loss of efficiency and productivity, causing the user to become frustrated. Further examples of devices that are affected by static interference or loss of functionality in the 2.4 GHz spectrum due to the use of high-speed connectors include BLUETOOTH speakers, wireless routers, wireless keyboards, and even cordless telephones. Users often resort to moving the high-speed connector or the wireless device away from one another to a distance where the interference is tolerable, but this may be several feet. Often, it is not feasible to move a peripheral wireless device, such as a mouse or keyboard, away from a computing device that houses a high-speed connector. In these situations, the user must endure the interference, forgo using the high-speed connector, or artificially reduce connector speeds, none of which are desirable choices.

Figure 1:
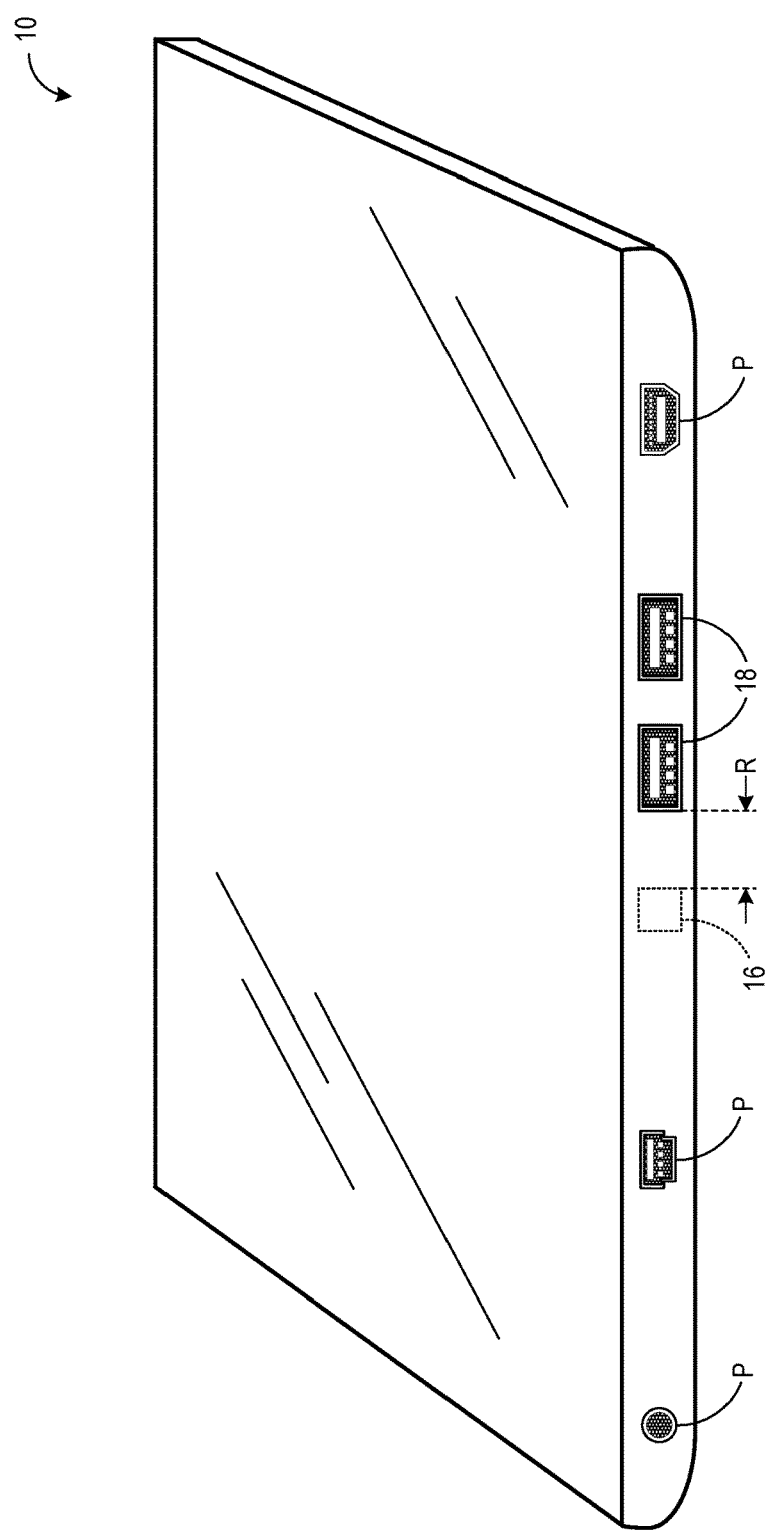
FIG. 1 shows a side view of a computing device with communication port connectors.
Figure 2:
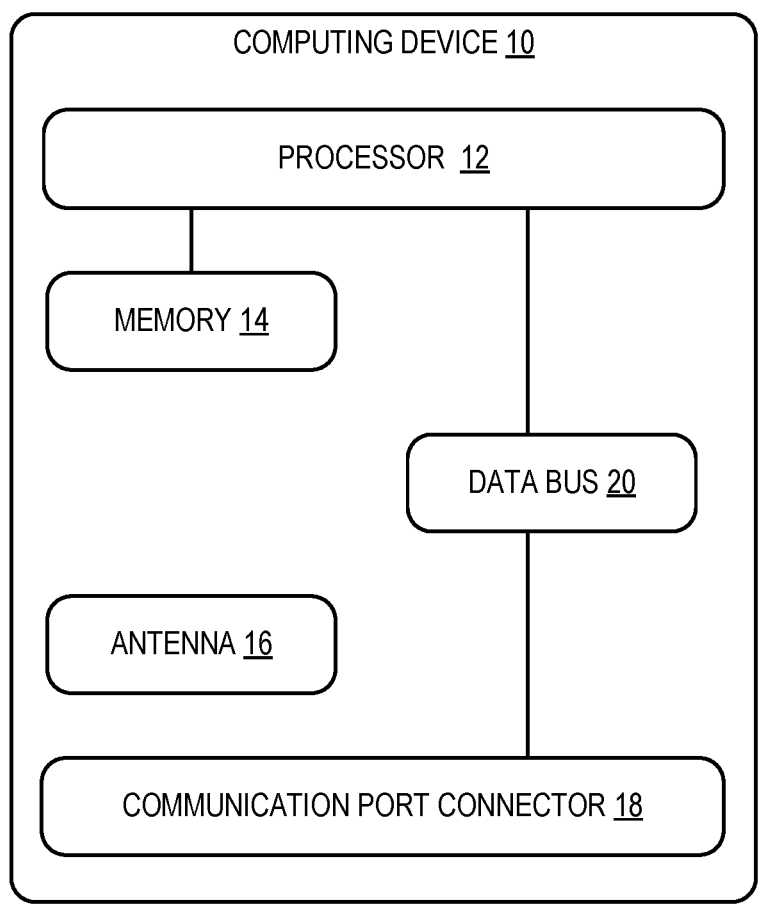
FIG. 2 shows a schematic view of the computing device of FIG. 1.

As illustrated in FIG. 1, to address the above identified issues, a computing device 10 is provided. The computing device 10 may include an internally mounted antenna 16 configured for use in wireless communications and one or more ports P, such as a communication port connector 18. Turning briefly to FIG. 2, the computing device 10 may further include a processor 12, a memory 14 operatively coupled to the processor, and a data bus 20 configured to transfer data from the communication port connector to the processor. Turning back to FIG. 1, the antenna 16 may be a WI-FI or BLUETOOTH antenna arranged on an interior of the computing device 10. Furthermore, the position of the antenna 16 may be in a range R of 5 mm to 80 mm from the communication port connector 18.

Figure 3:
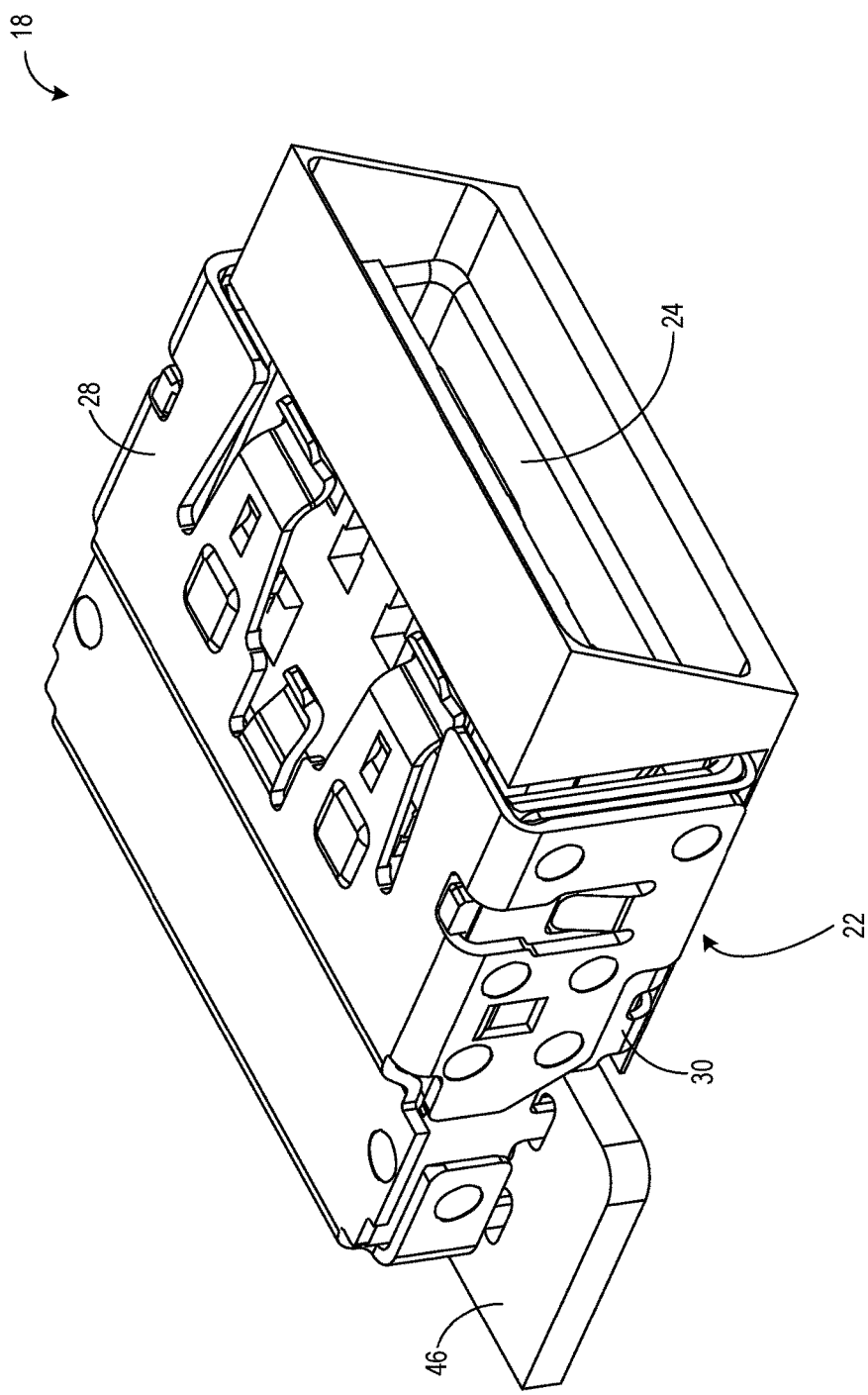
FIG. 3 shows a top perspective view of a communication port connector, according to one implementation of the present disclosure.
Figure 4:
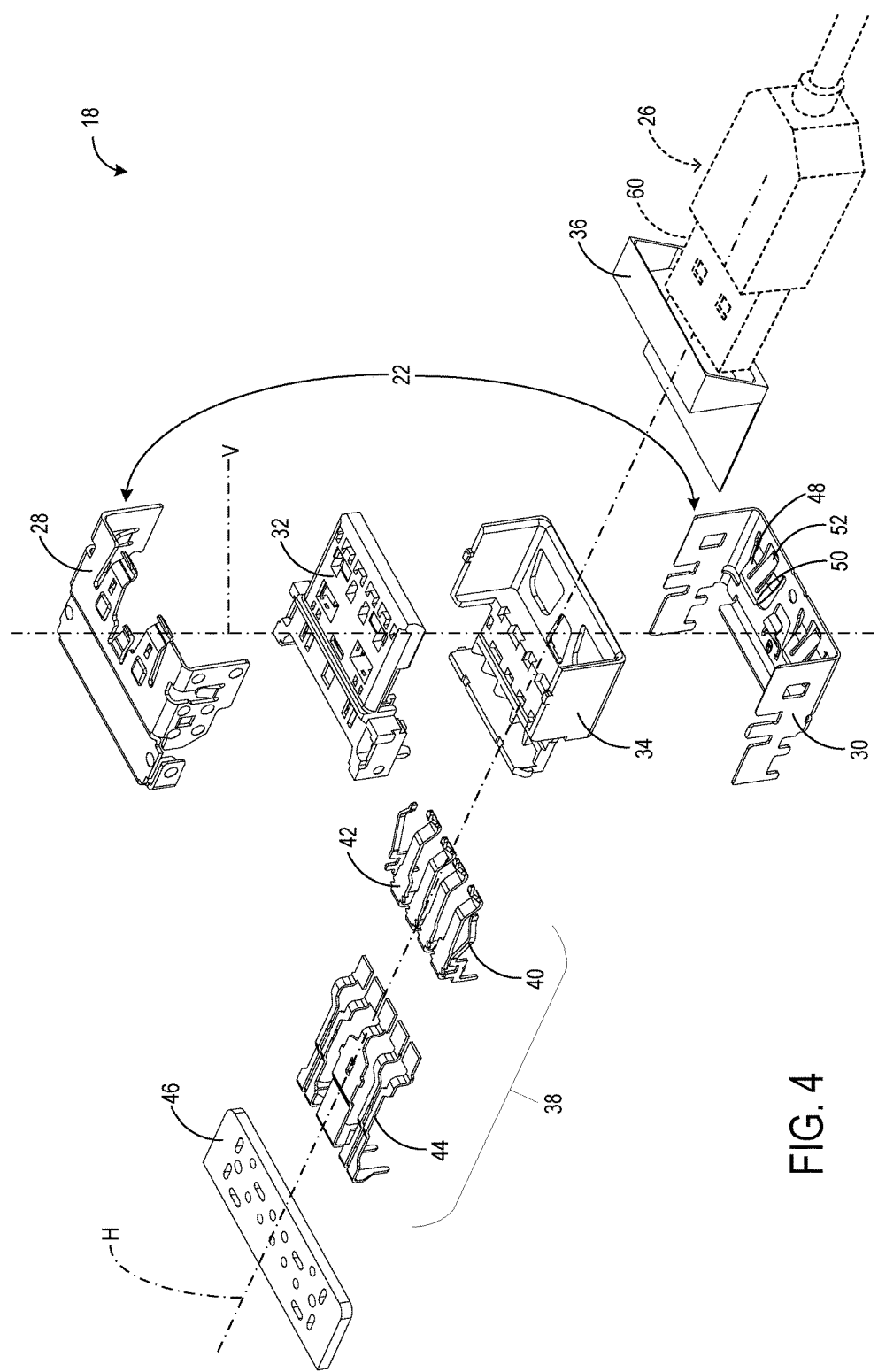
FIG. 4 shows an exploded view of the communication port connector of FIG. 3.

As shown in FIG. 3, a communication port connector 18 for use in a computing device 10 may be provided. The communication port connector may include a shell 22 that defines a void 24. With reference to FIG. 4, the void may be configured to receive an electrical plug 26, and the shell 22 of the communication port connector 18 may be comprised of an upper shell 28 and a lower shell 30.

Turning to FIG. 4, an exploded view of the communication port connector 18 is provided. From the top of the vertical axis V along which the parts are exploded, the upper shell 28 may be arranged atop a tongue 32. From the bottom of the vertical axis, a plastic liner 34 may nest inside the lower shell 30. When assembled, the lower shell 30 may fit into the upper shell 28 to form the shell 22. The tongue 32 may be arranged inside the void defined by the plastic liner 34 and under the upper shell 28. While the example implementation illustrates the shell 22 being comprised of an upper shell 28 and a lower shell 30, it will be understood that the shell may be formed as a single piece.

Beginning at the right side of the horizontal axis H along which the parts are exploded, an electrical plug 26 is provided to illustrate the relationship to the communication port connector 18. The communication port connector 18 may further include a chassis 36 and port-side electrical contacts 38. The port-side electrical contacts 38 may be positioned within the shell 22 and configured to make electrical connections with plug-side electrical contacts of the electrical plug 26. Further, the port-side electrical contacts may include electromagnetic interference contact fingers 40 and at least one electrical contact 42, 44 compatible with a UNIVERSAL SERIAL BUS (USB) specification. The illustrated implementation includes USB 2.0 and USB 3.0 and/or USB 3.1 electrical contacts 42, 44, which may be compatible with a USB specification. However, it will be appreciated that the electrical contact or contacts compatible with a USB specification may be of a type other than USB 2.0, USB 3.0, and/or USB 3.1, including legacy USB 1.x specifications and future versions beyond USB 3.1. It will be appreciated that the described configuration may also be implemented in USB-A, USB-B, or USB-C connector types, including Mini- and Micro-connectors, or in a high-speed connector of a type different from USB. Specifically, the present disclosure addresses the interference issue of high-speed electrical contacts compatible with a USB specification of USB 3.0 or greater that cause interference in the 2.4 GHz spectrum. In its assembled form, the communication port connector 18 may be arranged on a printed circuit board 46 in the computing device 10, as illustrated in FIGS. 3 and 4. While the example implementation provided here in illustrates the communication port connection 18 on a printed circuit board 46, it will be understood that the communication port connector may be otherwise arranged, such as on a flexible printed circuit.

Figure 10:
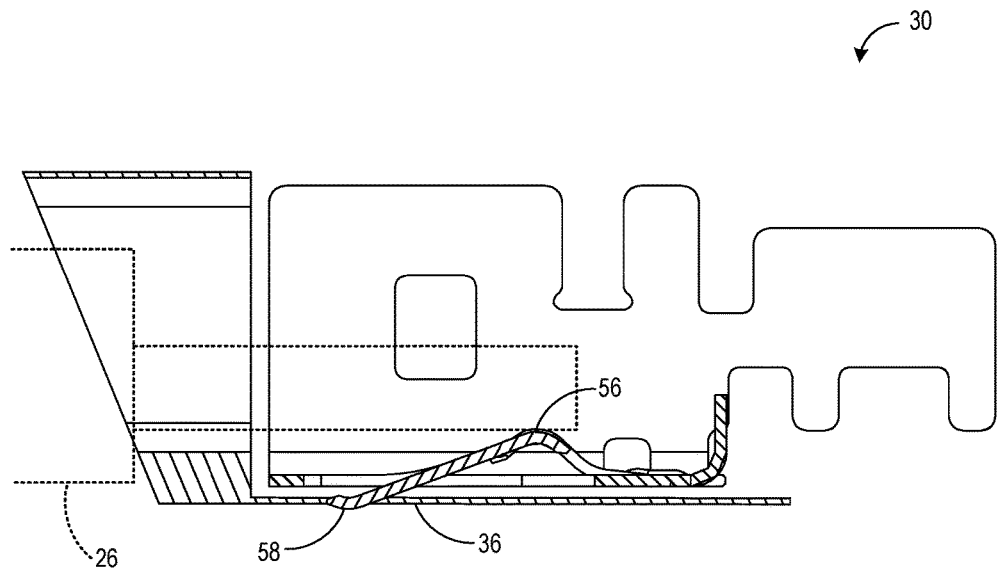
FIG. 10 shows a cross-sectional side view of the lower shell and a chassis of the communication port connector of FIG. 3, taken along line A-A of FIG. 7.

Continuing with FIG. 4, the communication port connector 18 further includes one or more double leaf spring fingers 48 formed in a side of the shell 22. Each double leaf spring finger may be comprised of at least a first spring finger 50 and a second spring finger 52 coupled to the first spring finger 50. The first spring finger 50 may be configured to flex toward the void 24 to contact the electrical plug 26 when it is inserted into the communication port connector 18. With reference to FIG. 10, the second spring finger 52 may be configured to flex away from the void 24 to contact the chassis 36 of the computing device 10, which is the primary ground plane of the computing device 10, to thereby electrically ground the electrical plug 26 to the chassis 36 when inserted in the communication port connector 18. While the illustrated example shows the first spring finger 50 flexing toward the void 24 and the second spring finger 52 flexing away from the void, it will be appreciated that this configuration could be reversed such that the first spring finger 50 flexes away from the void while the second spring finger 52 flexes toward the void.

Figure 5:
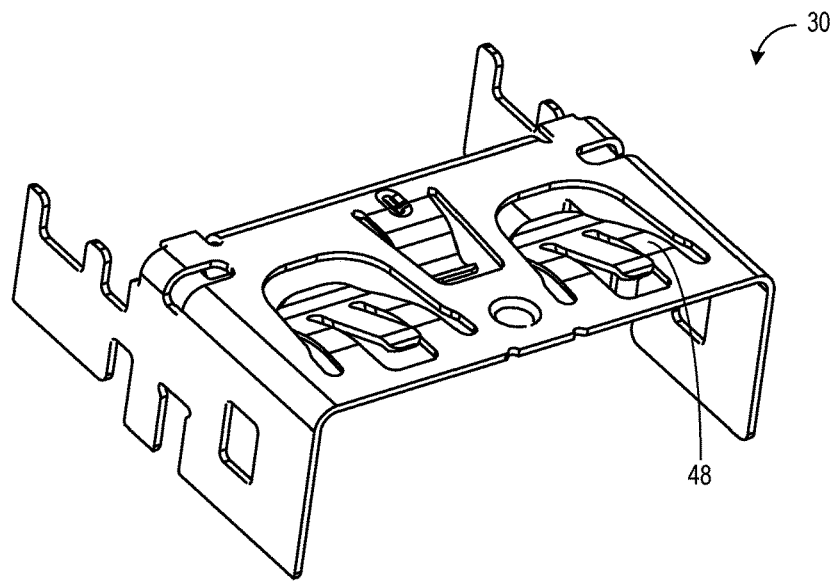
FIG. 5 shows a bottom perspective view of a lower shell of the communication port connector of FIG. 3.

Looking now at FIG. 5, a bottom perspective of the lower shell 30 is provided. As shown in the illustrated implementation, the double leaf spring finger 48 may be formed in the lower shell 30 of the communication port connector 18. In the provided example, the lower shell 30 of the communication port connector 18 includes two double leaf spring fingers 48 arranged in the lower shell 30. However, it will be appreciated that a communication port connector 18 may include fewer or more than two double leaf spring fingers 48. It will be further appreciated that the location of the double leaf spring fingers 48 is not limited to the lower shell 30 and may be arranged in one or more alternate surfaces of the communication port connector 18.

Figure 6:
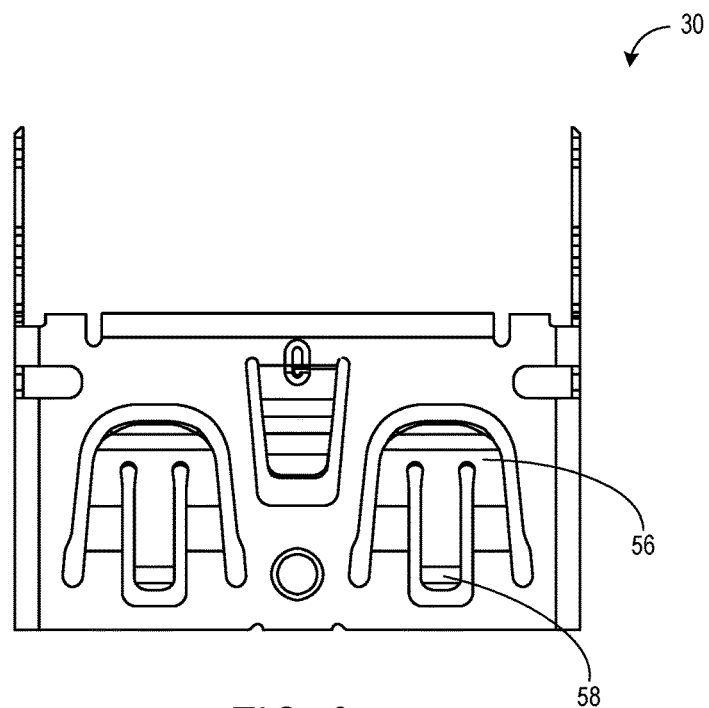
FIG. 6 shows a bottom view of the lower shell of the communication port connector of FIG. 3.

FIG. 6 is a bottom view of the lower shell 30, showing that the first spring finger 50 may be an outer spring finger 56 formed to be U-shaped. The second spring finger 52 may be a nested spring finger 58 formed inside the outer spring finger 56. As shown in the illustrated implementation of FIG. 6, the nested spring finger 58 may be arranged inside the outer spring finger 56 in an opposite orientation with respect to the outer spring finger 56 such that a base of the nested spring finger 58 is inside a tip of the outer spring finger 56. This configuration of the double leaf spring finger 48 in which a nested spring finger 58 is arranged inside the outer spring finger 56 minimizes the length of the overall spring finger and creates the flexibility required for a large tolerance stack. Further, the double leaf spring finger 48 is fully compatible with a plastic liner 34, and it is designed to withstand the insertion/extraction forces applied with daily use. While the nested spring finger 58 in FIG. 6 is shown to reside entirely within the boundary of the outer spring finger 56, it will be appreciated that the nested spring finger 56 may be arranged such that a portion is outside of the boundary of the outer spring finger 56. It will further be appreciated that the shape of the outer spring finger 56 is not limited to a U-shape and may be formed in an alternate shape.

Figure 7:
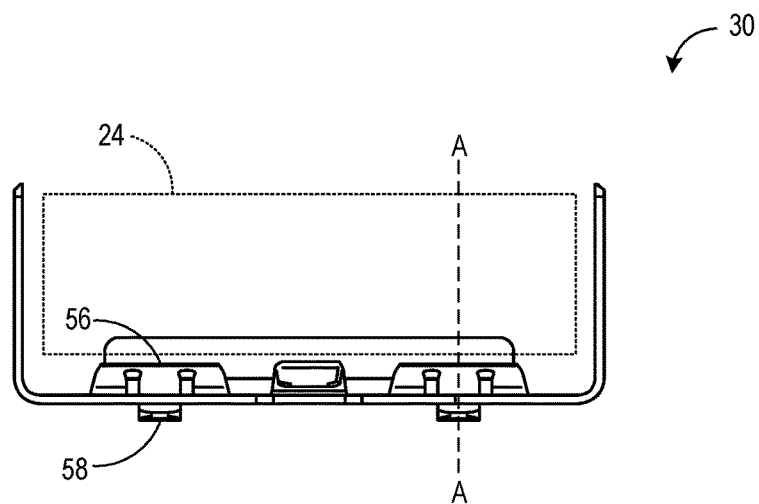
FIG. 7 shows a front view of the lower shell of the communication port connector of FIG. 3.
Figure 8:
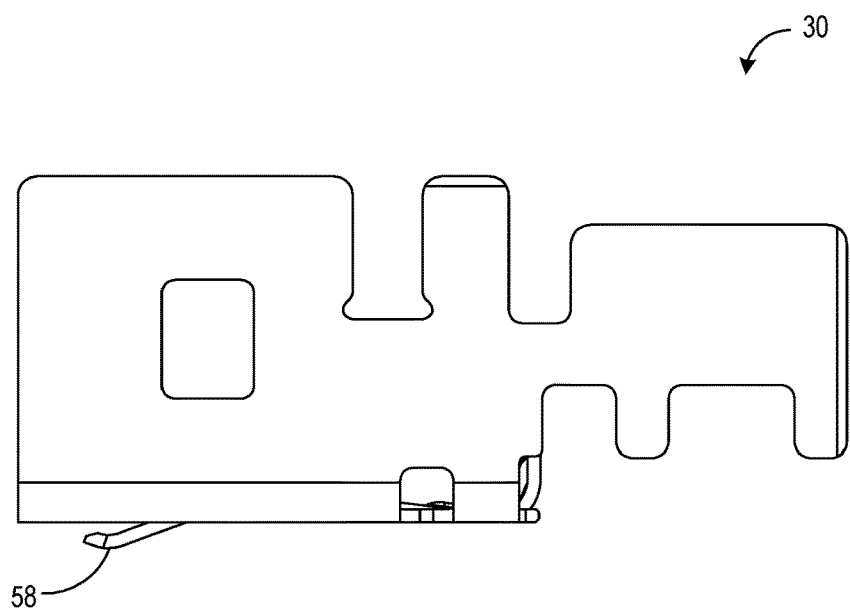
FIG. 8 shows a side view of the lower shell of the communication port connector of FIG. 3.
Figure 9:
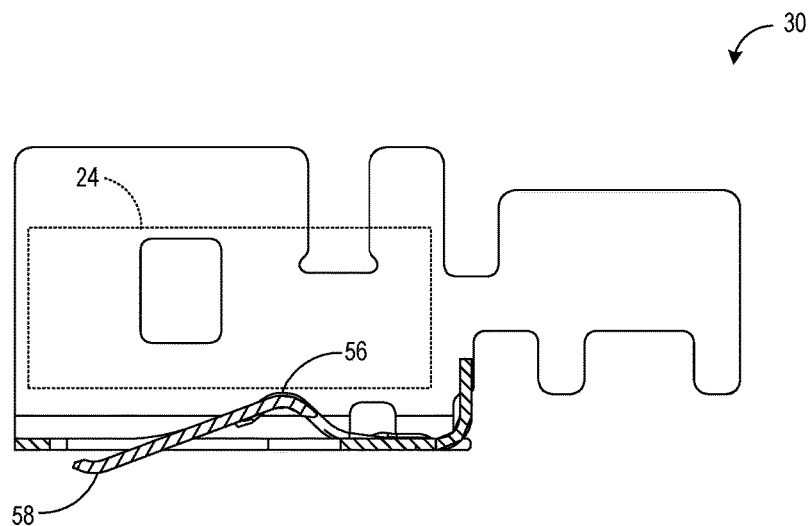
FIG. 9 shows a cross-sectional side view of the lower shell of the communication port connector of FIG. 3, taken along line A-A of FIG. 7.

Turning to FIG. 7, a front view of the lower shell 30 is provided, showing that the nested spring fingers 58 flex away from the void 24, while the outer spring fingers 56 flex toward the void 24. FIGS. 8 and 9 provide side and cross-sectional side views, respectively, of the lower shell 30. As illustrated, with reference to FIG. 10, the nested spring finger 58 extends below the bottom of the lower shell 30, allowing the nested spring finger 58 to contact the chassis 36 of the computing device 10.

A cross-sectional view of the lower shell 30 with the electrical plug 26 and chassis 36 is provided in FIG. 10. As shown, the nested spring finger 58 flexes away from the void 24 (occupied by the electrical plug 26) and extends to contact the chassis 36. In the illustrated implementation, the chassis 36 may be a conductor that serves as the primary ground plane in the computing device 10. Further, the first spring finger 50, shown as the outer spring finger 56 in the illustrated implementation, may be configured to flex toward the void 24 to contact a ground conductor 60 (see FIG. 4) on an external side of the electrical plug 26. The ground conductor 60 may be, for example, an outer shell of the plug 26.

In this way, the double leaf spring finger 48 may be a conductor that creates a ground path between the electrical plug 26 and the computing device 10 by conducting residual energy from the shell of the electrical plug 26 to a primary ground plane in the computing device.

An effective ground path between the electrical plug 26 and the computing device 10 may include materials with high levels of electrical conductivity, such as metals. Thus, it is desirable for the shell 22 of the communication port connector 18 to be formed of a metal or metallic compound. Additionally, portions of the double leaf spring finger 48 that contact the electrical plug 26 or the chassis 36 may be plated with gold, as gold is highly conductive but does not corrode as other metals. To provide a ground path that directs the flow of electricity from the electrical plug 26 to the chassis 36 via contact points on the double leaf spring finger 48, portions of the double leaf spring finger 48 that do not contact the electrical plug 26 or the chassis 36 may be plated with a material that is less conductive than gold. In an example implementation, portions of the double leaf spring finger 48 that do not contact the electrical plug 26 or the chassis 36 may be plated with nickel. However, it will be appreciated that the plating materials for the double leaf spring finger are not limited to gold or nickel, and that these and other materials may be used to plate all or any portion of the double leaf spring finger.

The described configuration of the communication port connector 18, in which the double leaf spring finger 48 grounds the electrical plug 26 to the chassis 36, may prevent energy leakage in the form of radio frequency interference. For example, a wireless antenna 16 may be arranged on the interior of a computing device as close as 5 mm to the communication port connector 18 without experiencing measurable interference from the communication port connector 18, as shown in FIG. 1. Further, while the provided illustration shows an internally-mounted wireless antenna 16, it will be appreciated that the present disclosure addresses the issue of interference not only with an antenna 16 mounted in the computing device 10, but also with other nearby wireless antennas (e.g., of other devices) that may be affected by the use of a high-speed port.

The computing device 10 illustrated in FIG. 1 may be in the form of a tablet computer, and is shown in simplified form in FIG. 2. However, the computing device 10 may also be a personal computer, server computer, home-entertainment computer, network computing device, gaming device, mobile computing device, mobile communication device (e.g., smartphone), smart television, wearable computing device such as a smart wristwatch or head-mounted augmented reality device, and/or other computing device. Furthermore, while the communication port connector 18 may be illustrated as a USB TYPE-A connector in FIG. 1, it may be adapted to be a USB TYPE-B, USB TYPE-C, MINI USB, MICRO USB, DISPLAYPORT, MINI DISPLAYPORT, or other suitable type of connector. Further, although the above implementations have been described as addressing interference in the 2.4 GHz spectrum, it will be appreciated that these implementations may also reduce or eliminate interference in other spectra, such as 900 MHz, 5 GHz, etc.

Processor 12 and memory 14 are shown in a simplified manner in FIG. 2. The processor 12 may be embodied by one or more hardware logic circuits or firmware devices configured to execute hardware-implemented logic or firmware instructions. Memory 14 may include semiconductor memory (e.g., RAM, EPROM, EEPROM, FLASH memory, etc.), and/or magnetic memory (e.g., hard-disk drive, MRAM, etc.), or other mass storage device technology. Memory 14 may include volatile, nonvolatile, dynamic, static, read/write, read-only, random-access, sequential-access, location-addressable, file-addressable, and/or content-addressable devices. Aspects of processor 12 and memory 14 may be integrated together into one or more hardware-logic components such as a program- and application-specific integrated circuit (PASIC/ASIC) or system-on-a-chip (SOC), for example.

The following paragraphs provide additional support for the claims of the subject application. One aspect provides a communication port connector for use in a computing device comprising a shell that defines a void that may be configured to receive an electrical plug, port-side electrical contacts positioned within the shell that may be configured to make electrical connections with plug-side electrical contacts of the electrical plug, and one or more double leaf spring fingers formed in a side of the shell. Each double leaf spring finger may be comprised of at least a first spring finger and a second spring finger coupled to the first spring finger. The first spring finger may be configured to flex toward the void to contact the electrical plug, and the second spring finger may be configured to flex away from the void to contact a chassis of the computing device, to thereby electrically ground the electrical plug to the chassis when inserted in the communication port connector. In this aspect, additionally or alternatively, the double leaf spring finger may be a conductor that creates a ground path between the electrical plug and the computing device by conducting residual energy from a shell of the electrical plug to a primary ground plane in the computing device. In this aspect, additionally or alternatively, the chassis may be a conductor that serves as the primary ground plane in the computing device. In this aspect, additionally or alternatively, the first spring finger may be configured to contact a ground conductor on an external side of the electrical plug. In this aspect, additionally or alternatively, the shell of the communication port connector may be comprised of an upper shell and a lower shell. In this aspect, additionally or alternatively, the double leaf spring finger may be formed in the lower shell of the communication port connector. In this aspect, additionally or alternatively, the shell of the communication port connector may be formed of a metal or metallic compound. In this aspect, additionally or alternatively, portions of the double leaf spring finger that contact the electrical plug and/or the chassis may be plated with gold, and portions of the double leaf spring finger that do not contact the electrical plug or the chassis may be plated with a material that is less conductive than gold. In this aspect, additionally or alternatively, portions of the double leaf spring finger that do not contact the electrical plug or the chassis may be plated with nickel. In this aspect, additionally or alternatively, the first spring finger may be an outer spring finger formed to be U-shaped, the second spring finger may be a nested spring finger formed inside the outer spring finger, and the nested spring finger may be arranged inside the outer spring finger in an opposite orientation with respect to the outer spring finger such that a base of the nested spring finger may be inside a tip of the outer spring finger. In this aspect, additionally or alternatively, the port-side electrical contacts may include electromagnetic interference contact fingers and at least one electrical contact compatible with a UNIVERSAL SERIAL BUS specification. In this aspect, additionally or alternatively, the connector may be arranged on a printed circuit board or flexible circuit board in the computing device.

Another aspect provides a computing device comprising a processor, a memory operatively coupled to the processor, an antenna that may be configured for use in wireless communications, one or more communication port connectors, and a data bus that may be configured to transfer data from the communication port connector to the processor. The communication port connector may comprise a shell that defines a void that may be configured to receive an electrical plug, port-side electrical contacts positioned within the shell that may be configured to make electrical connections with plug-side electrical contacts within the electrical plug, and one or more double leaf spring fingers formed in a side of the shell. Each double leaf spring finger may be comprised of at least a first spring finger and a second spring finger coupled to the first spring finger. The first spring finger may be configured to flex toward the void to contact the electrical plug, and the second spring finger may be configured to flex away from the void to contact a chassis of the computing device, to thereby electrically ground the electrical plug to the chassis when inserted in the communication port connector. In this aspect, additionally or alternatively, the antenna may be a WI-FI or BLUETOOTH antenna arranged on an interior of the computing device, and the position of the antenna may be in a range of 5 mm to 80 mm from the communication port connector. In this aspect, additionally or alternatively, the chassis may be a conductor that serves as the primary ground plane in the computing device. In this aspect, additionally or alternatively, the first spring finger may be configured to contact a ground conductor on an external side of the electrical plug. In this aspect, additionally or alternatively, portions of the double leaf spring finger that contact the electrical plug and the chassis may be plated with gold, and portions of the double leaf spring finger that do not contact the electrical plug or the chassis may be plated with nickel. In this aspect, additionally or alternatively, the first spring finger may be an outer spring finger formed to be U-shaped, the second spring finger may be a nested spring finger formed inside the outer spring finger, and the nested spring finger may be arranged inside the outer spring finger in an opposite orientation with respect to the outer spring finger such that a base of the nested spring finger may be inside a tip of the outer spring finger. In this aspect, additionally or alternatively, the communication port connector may be arranged on a printed circuit board or flexible circuit board in the computing device.

Another aspect provides a computing device comprising a processor, a memory operatively coupled to the processor, an antenna that may be configured for use in wireless communications, one or more communication port connectors, and a data bus that may be configured to transfer data from the communication port connector to the processor. The antenna may be a WI-FI or BLUETOOTH antenna arranged on an interior of the computing device in a range of 5 mm to 80 mm from the communication port connector. The communication port connector may comprise a shell that defines a void that may be configured to receive an electrical plug, port-side electrical contacts positioned within the shell that may be configured to make electrical connections with plug-side electrical contacts within the electrical plug, and one or more double leaf spring fingers formed in a side of the shell. Each double leaf spring finger may be a conductor comprised of at least a first spring finger and a second spring finger coupled to the first spring finger. The first spring finger may be configured to flex toward the void to contact the electrical plug, and the second spring finger may be configured to flex away from the void to contact a chassis of the computing device, to thereby electrically ground the electrical plug to the chassis when inserted in the communication port connector.

It will be understood that the configurations and/or approaches described herein are exemplary in nature, and that these specific implementations or examples are not to be considered in a limiting sense, because numerous variations are possible. The specific configurations described herein may represent one or more of any number of possible configurations. The subject matter of the present disclosure includes all novel and non-obvious combinations and subcombinations of the various components, devices, and systems, and other features, functions, acts, and/or properties disclosed herein, as well as any and all equivalents thereof.

The invention claimed is:

1. A communication port connector for use in a computing device, the communication port connector comprising:
    a shell that defines a void configured to receive an electrical plug;
    port-side electrical contacts positioned within the shell and configured to make electrical connections with plug-side electrical contacts of the electrical plug; and
    one or more double leaf spring fingers formed in a side of the shell, wherein,
    each double leaf spring finger is comprised of at least a first outer spring finger and a second nested spring finger coupled to the first outer spring finger,
    the second nested spring finger is formed inside the first outer spring finger and arranged in an opposite orientation with respect to the first outer spring finger such that a base of the second nested spring finger is inside a tip of the first outer spring finger,
    the first outer spring finger being configured to flex toward the void to contact the electrical plug, and
    the second nested spring finger being configured to flex away from the void to contact a chassis of the computing device, to thereby electrically ground the electrical plug to the chassis when inserted in the communication port connector.

2. The communication port connector of claim 1, wherein the double leaf spring finger is a conductor that creates a ground path between the electrical plug and the computing device by conducting residual energy from a shell of the electrical plug to a primary ground plane in the computing device.

3. The communication port connector of claim 1, wherein the chassis is a conductor that serves as a primary ground plane in the computing device.

4. The communication port connector of claim 1, wherein the first outer spring finger is configured to contact a ground conductor on an external side of the electrical plug.

5. The communication port connector of claim 1, wherein the shell of the communication port connector is comprised of an upper shell and a lower shell.

6. The communication port connector of claim 5, wherein the double leaf spring finger is formed in the lower shell of the communication port connector.

7. The communication port connector of claim 1, wherein the shell of the communication port connector is formed of a metal or metallic compound.

8. The communication port connector of claim 1, wherein
    portions of the double leaf spring finger that contact the electrical plug and/or the chassis are plated with gold, and
    portions of the double leaf spring finger that do not contact the electrical plug or the chassis are plated with a material that is less conductive than gold.

9. The communication port connector of claim 8, wherein portions of the double leaf spring finger that do not contact the electrical plug or the chassis are plated with nickel.

10. The communication port connector of claim 1, wherein
    the first outer spring finger is formed to be U-shaped.

11. The communication port connector of claim 1, wherein the port-side electrical contacts include electromagnetic interference contact fingers and at least one electrical contact compatible with a UNIVERSAL SERIAL BUS specification.

12. The communication port connector of claim 1, wherein the connector is arranged on a printed circuit board or flexible circuit board in the computing device.

13. A computing device, comprising:
a processor;
a memory operatively coupled to the processor;
an antenna configured for use in wireless communications;
a communication port connector; and
a data bus configured to transfer data from the communication port connector to the processor, wherein
the communication port connector comprises:
    a shell that defines a void configured to receive an electrical plug;
    port-side electrical contacts positioned within the shell and configured to make electrical connections with plug-side electrical contacts within the electrical plug; and
    one or more double leaf spring fingers formed in a side of the shell, wherein,
    each double leaf spring finger is comprised of at least a first outer spring finger and a second nested spring finger coupled to the first outer spring finger,
    the second nested spring finger is formed inside the first outer spring finger and arranged in an opposite orientation with respect to the first outer spring finger such that a base of the second nested spring finger is inside a tip of the first outer spring finger,
    the first outer spring finger being configured to flex toward the void to contact the electrical plug, and
    the second nested spring finger being configured to flex away from the void to contact a chassis of the computing device, to thereby electrically ground the electrical plug to the chassis when inserted in the communication port connector.

14. The computing device of claim 13, wherein
the antenna is a WI-FI or BLUETOOTH antenna arranged on an interior of the computing device, and
the position of the antenna is in a range of 5 mm to 80 mm from the communication port connector.

15. The computing device of claim 13, wherein the chassis is a conductor that serves as a primary ground plane in the computing device.

16. The computing device of claim 13, wherein the first outer spring finger is configured to contact a ground conductor on an external side of the electrical plug.

17. The computing device of claim 13, wherein
portions of the double leaf spring finger that contact the electrical plug and the chassis are plated with gold, and
portions of the double leaf spring finger that do not contact the electrical plug or the chassis are plated with nickel.

18. The computing device of claim 13, wherein
the first outer spring finger is formed to be U-shaped.

19. The computing device of claim 13, wherein the communication port connector is arranged on a printed circuit board in the computing device.

20. A computing device, comprising:
a processor;
a memory operatively coupled to the processor;
an antenna configured for use in wireless communications;
a communication port connector; and
a data bus configured to transfer data from the communication port connector to the processor, wherein
the antenna is a WI-FI or BLUETOOTH antenna arranged on an interior of the computing device in a range of 5 mm to 80 mm from the communication port connector, and
the communication port connector comprises:
    a shell that defines a void configured to receive an electrical plug;
    port-side electrical contacts positioned within the shell and configured to make electrical connections with plug-side electrical contacts within the electrical plug; and
    one or more double leaf spring fingers formed in a side of the shell, wherein,
    each double leaf spring finger is a conductor comprised of at least a first outer spring finger and a second nested spring finger coupled to the first outer spring finger,
    the second nested spring finger is formed inside the first outer spring finger and arranged in an opposite orientation with respect to the first outer spring finger such that a base of the second nested spring finger is inside a tip of the first outer spring finger,
    the first outer spring finger being configured to flex toward the void to contact the electrical plug, and
    the second nested spring finger being configured to flex away from the void to contact a chassis of the computing device, to thereby electrically ground the electrical plug to the chassis when inserted in the communication port connector.

* * * * *